United States Patent Office 3,686,107
Patented Aug. 22, 1972

3,686,107
PRESSURE-SENSITIVE HOT-MELT ADHESIVES
Thomas E. Russell, Verona, N.J., assignor to The Flintkote Company, White Plains, N.Y.
No Drawing. Continuation of abandoned application Ser. No. 739,640, June 25, 1968. This application Mar. 24, 1971, Ser. No. 127,794
Int. Cl. C09j 3/26
U.S. Cl. 260—27 BB          10 Claims

ABSTRACT OF THE DISCLOSURE

A pressure-sensitive adhesive composition having instant room temperature tack, good cold flow resistance and good shear strength which comprises as a first component a resinous atactic polypropylene, as a second component a resinous rubbery block copolymer of styrene and butadiene or isoprene, and as a third component a modified or unmodified rosin, a coumarone-indene resin, a polyterpene resin, a diene-olefin aliphatic hydrocarbon resin or a polystyrene resin.

---

This application is a continuation of co-pending application Ser. No. 739,640 filed June 25, 1968, now abandoned.

This invention relates to pressure-sensitive adhesives, and more particularly to pressure-sensitive adhesives that have instant room temperature tack, good cold flow resistance and shear strength, are essentially unaffected by moisture, and can be made as hot melts without solvents.

Countless uses exist for pressure-sensitive adhesives that have good quick tack at ordinary temperatures, adhere to numerous surfaces upon contact with essentially no pressure, are essentially free of cold flow, so-called "creep," resist shearing stresses, do not deteriorate under moist conditions and retain their desirable properties during prolonged periods of storage, i.e., have good shelf-life. Such uses include being thinly coated onto the under surfaces of floor tiles and wall tiles that thereafter can be set quickly and permanently on floors or walls. The pressure-sensitive adhesives of this invention are especially suited for such uses, inter alia. Thus they can be coated onto substrates like floor and wall tiles by the manufacturer, and covered with a removable protective sheet to form a so-called "peel-and-stick" product.

An object of this invention is to provide pressure-sensitive adhesives. Another object of this invention is to provide pressure-sensitive adhesives that have good instant tack, high strength in shear, virtually no cold flow, resistance to moisture and storage stability. A further object of this invention is to provide a method for making such pressure-sensitive adhesives by hot-melt means without solvents. These and other objects of this invention will be in part discussed in and in part apparent from the following more detailed disclosure.

Broadly the pressure-sensitive adhesives of this invention contain three resinous components which, in intimate combination with one another in the proportions specified, provide the desirable properties hereinbefore discussed. The primary components are a resinous rubbery block copolymer of styrene and butadiene or styrene and isoprene, an atactic polypropylene polymeric resin, and one or more of a modified or unmodified rosin, coumarone-indene resin, polyterpene resin, diene-olefin aliphatic hydrocarbon resin or polystyrene resin. Other ingredients can, of course, be included in the adhesives to attain additional desiderata, for example, an antioxidant to protect the various resins, especially during hot-melt blending and coating of the adhesive in molten condition onto substrates. Moreover, by selection of particular components from among the variety of each available, the properties of the adhesive compositions can be modified somewhat as might be necessary. For example, shear strength and hot and cold flow for application can be modified by the selection as well as the proportioning of the rubbery block copolymer, whereas quick tack and pressure-sensitivity can be varied by the choice and proportion of the atactic polypropylene.

Rubbery block copolymers of styrene and butadiene or styrene and isoprene that are especially advantageous to use in the instant adhesives are those in which the monomers are not randomly mixed but rather are in groups of poly-monomers, i.e., groups or blocks of polystyrene-polybutadiene-polystyrene or polystyrene-polyisoprene-polystyrene. The polystyrene groups have molecular weights of from about 5,000 to about 125,000, preferably between about 8,000 and 45,000; the polybutadiene or polyisoprene blocks have molecular weights of between about 15,000 and about 250,000, preferably from about 35,000 to about 150,000. Such copolymers can contain from about 20% to about 80% of either block polymer. Such rubbery block copolymers are commercially available under its trade name "Kraton," for example, Kraton 101 and 102 which are polystyrene-polybutadiene-polystyrene (S–B–S) copolymers, and Kraton 107 which is the polyisoprene (S–B–S) counterpart. They can be used in amounts of between about 7% and about 30% by weight of the tri-component adhesive, preferably from about 10% to 25% by weight. Combinations of different rubbery block copolymers can be used.

Another principal component of the pressure-sensitive adhesive compositions of this invention is an atactic polypropylene, an essentially non-crystalline polypropylene formed in comparatively small amounts during the production of isotactic, or crystalline, polypropylene by stereoscopic polymerization of propylene. The solid atactic polypropylene has a molecular weight of between about 15,000 and about 60,000, and preferably for suitability in the instant adhesives from about 16,000 to about 20,000. A commercially available atactic polypropylene for such use is available from Avisun Corporation under the name "Oletac" 100. This component is included in the adhesive compositions in an amount of from about 5% to about 35% by weight thereof, desirably in an amount between about 9% to about 30%.

The third principal component of the subject adhesives can be a modified or unmodified rosin, polyterpene, coumarone-indene, polystyrene or diene-olefin aliphatic hydrocarbon resin. Such rosins include ethylene glycol, polyethylene glycol, glycerol and pentaerythritol rosin esters, hydrogenated rosin esters or methylated rosin esters, for example, the commercially available materials "Staybelite" Ester 3 triethylene glycol ester of hydrogenated rosin, "Foral" 85 and 105 highly stabilized ester resins of pentaerythritol and rosin base, "Hercolyn" D hydrogenated methyl ester of rosin purified by steam distillation, and "Pentalyn" H pentaerythritol ester of hydrogenated rosin. Suitable terpene polymers are, for example, solid or liquid poly-($\alpha$-pinene) such as "Piccolyte Alpha" 10, 25 and 115 having corresponding softening points and degrees C. and molecular weights of 100, 125 and 1200, and poly-($\beta$-pinene) such as "Piccolyte" S–100 and S–115 having molecular weights of about 1200. Coumarone-indene resins are available as "Piccovar" L–30 and L–60, which have molecular weights of about 600 to 700, "Nevex" 100 and "Nevchem" 100 and 140. Diene-olefin aliphatic hydrocarbon resins are, for example, "Piccopale" 45, 85 and 110, which have molecular weights of about 600, 1000 and 1500. The polystyrene resins are of intermediate molecular weight, e.g., from about 300 to about 6000, preferably to about 1000. Suitable commercially available resins include "Piccolastic" A, D and E series, especially the A series.

These third-component resins can be used in the adhesives in an amount of from about 45% to about 80% by weight of the principal components, preferably between about 50% and about 65%. They can be used in combination either with resins of the same class, for example, the Piccolyte Alpha 25, 100 and 115, poly-(α-pinene) resins or two or three of the different classes, for example Foral 105 highly stabilized ester resin and Piccolyte Alpha 25. In general the proportions of each resin in a class, or of each resin of the different classes, can vary quite widely, the determining factor seeming to be those discussed hereinbefore, e.g., the specific desired extent of properties such as quick tack, pressure-sensitivity, cold flow, shear strength, coatability of the molten adhesive and so forth. No specific rule presently appears to prevail. As an example, a highly satisfactory and therefore a preferred combination is from about 10% to about 40% by weight of the modified or unmodified rosin component and between about 15% and about 50% by weight of the polyterpene, their total being about 50% to about 65% of the tri-component composition.

From about 0.01% to about 2.0% by weight of one or more antioxidants desirably are added to the adhesives. Antioxidants known to be effective for the various components, especially for the rubbery block copolymer and the atactic polypropylene, can be used. Such antioxidants include, for example, "Ionox" 220 and 330 tris (di-t-butyl-p-hydroxybenzy)-trimethylbenzene, "Dalpac" 4C 2,6-di(t-butyl)-p-cresol, "Naugawhite" alkylated bisphenol and "Butyl Zimate" zinc dibutyl dithiocarbamate. Ordinarily about 0.4% to about 1.0% of antioxidant, based on the amount of composition, is sufficient.

The rubbery polystyrene-poly(conjugated diene)-polystyrene block copolymers are thermoplastic in nature and have no sharp melt point. Thus they cannot simply be melted with the other resins to any appreciably significant extent. For example, Kraton 107 can be hot melted with the other components to an extent of perhaps up to about 10%, although not easily beyond about 5%. Kraton 101 and 102, however, are far less addable by melting. It has been found possible, however, to avoid using a solvent for the rubbery copolymer, and instead to prepare the pressure-sensitive adhesives of this invention containing sufficient rubbery block copolymers by a completely hot-melt technique. An additional benefit of the method is that the adhesives can be melt coated onto suitable substrates; solvent coating systems are unnecessary.

Initially at least a substantial portion of a rubbery block copolymer, which is ordinarily produced in crumb form, is mechanically mixed with a portion of the rosin, polyterpene, coumarone-indene, diene-olefin or polystyrene component to form an intimate, meltable mix. Generally the latter component is preblended in an amount ranging from about one-half to about equal the amount of block copolymer, preferably at least about three-quarters as much. Considerable variation is possible depending upon the specific resins and overall proportions. Mastication of those two components can be accomplished in an ordinary rubber mill or other high shear kneading or milling device, for example, a Banbury mill. Pre-blending is at room temperature or up to about 150° F. Although it is possible to work at either lower or higher temperatures, practical factors tend to preclude doing so, for example, degradation of the resins and difficulty of blending and removing them. Preblending in a rubber mill at room temperature ordinarily requires in the order of about one-half hour to about three hours, usually about one hour, to prepare a uniform mix of rubbery, crepe-like consistency. The meltable preblend thus prepared can be diced or sliced for convenient subsequent melting.

The adhesive composition is completed by melting the preblended components in an agitated vessel heated at from about 270° F. to about 400° F., usually about 325° to 375° F. An antioxidant can be added as soon as it readily will mix with the melting preblend. Thereafter the other components of the adhesive are added directly to the hot melt, preferably first any of the polyisoprene-block copolymer that was not preblended followed by the atactic polypropylene and then the remaining modified or unmodified rosin, polyterpene, coumarone-indene, diene-olefin or polystyrene resin component. The batch is blended until a clear, smooth-running, homogeneous composition is formed. The composition can be coated onto a substrate, for example, as a coating from about 1 to about 5 mils thick, preferably about 2 to 4 mils, or can be cooled to a resilient, tacky solid at room temperature for subsequent remelting and application, e.g., at about 350° F.

Adhesives according to this invention, which are at least essentially 100% solids, have a Brookfield viscosity (No. 7 spindle at 300° F., 20 r.p.m.) in the range of about 25,000 to 150,000 cps., preferably about 35,000 to 65,000 cps.; a softening point (Ring and Ball, ASTM D–36–26) of at least about 200° F., preferably from about 225° F. to 275° F.; a penetration hardness (ASTM D–5–49, room temperature) in the range of about 0.35 cm. to 1.3 cm., preferably about 0.5 cm. to 0.8 cm.; and a loss on heating (ASTM D–6–39T, 5 hours at 300° F.) of about 10% maximum, preferably below about 5%.

The following examples are specific embodiments of adhesive compositions set forth to illustrate the invention.

EXAMPLE 1

A mix of 15.00 parts (by weight unless otherwise specified) of Kraton 101 polyestyrene-polybutadiene-polystyrene block copolymer crumb and 11.00 parts of Foral 105 stabilized pentaerythritol rosin ester was masticated in a rubber mill for about one hour at room temperature until a uniform crepe-like composition was formed. The composition was then melted at about 325° F. to 350° F. in a heated vessel having a stirrer. An antioxidant, 0.50 part of Dalpac 4C, a 2,6-di(t-butyl)-p-cresol, was added as the preblend melted. Thereafter 7.00 parts of Kraton 107 polystyrene-polyisoprene-polystyrene resin, 18.00 parts of Oletac 100 atactic polypropylene, 12.00 parts of Piccolyte Alpha 115 and 36.50 parts of Piccolyte Alpha 25, both polyterpene resins were added to the hot melt. Mixing of the hot melt was continued for about one-half hour until a clear, smoothly-flowing, homogeneous composition was formed. The composition was poured into a mold and cooled to a resilient block at room temperature.

A portion of the solid adhesive thus prepared was melted and coated at about 300° F. onto 9" x 9" vinyl-asbestos floor tiles. The pressure-sensitive coating, which was about 4 mils thick on the tiles, had good quick tack, good pressure-sensitivity and virtually no cold flow. Some of the tiles were placed on a cleaned concrete floor on which they had excellent shear strength. Similar results were obtained with other tiles placed on a vertical plywood wall.

The adhesive composition was coated onto various materials and tested for peel strength (Pressure Sensitive Tape Council #1, at 180° F.). The results were greater than 160 ounces per inch on plywood, stainless steel, asbestos cement and vinyl asbestos substrates. The results were essentially the same both after 4 months under water and after accelerated shell life at 130° F. The alkaline nature of moist cement did not affect the adhesion. Silicon-treated parchment paper was placed on the adhesive coating during storage, and could be peeled off easily for use.

A coating 2 mils thick vinyl-asbestos tile produced a shear adhesion, or "holding power," at 130° F. (P.S.T.C. #7) of about 30 minutes.

EXAMPLE 2

A pressure-sensitive hot-melt adhesive was prepared substantially as described in Example 1 from a preblend of 13.90 parts of Kraton 101 and 13.90 parts of Pentalyn H pentaerythritol ester of hydrogenated rosin, to which preblend were added 27.90 parts of Oletac 100, 27.90 parts of Foral 105, 16.00 parts of Piccolyte Alpha 25 and 0.4 part of Dalpac 4C. Coatings of the adhesive on various materials produced similar satisfactory results as described in Example 1.

EXAMPLE 3

A pressure-sensitive hot-melt adhesive was prepared substantially as described in Example 1 from a preblend of 7.60 parts of Kraton 101 and 7.60 parts of Foral 105, to which preblend were added 4.50 parts of Kraton 107, 27.70 parts of Oletac 100, 31.80 parts of Foral 105, 17.20 and 3.10 parts of Piccolyte Alpha 25 and 10, respectively, and 0.5 part of Dalpac 4C antioxidant. Coatings of the adhesive on various materials produced similar satisfactory results as described in Example 1.

EXAMPLE 4

A pressure-sensitive hot-melt adhesive was prepared substantially as described in Example 1 from 15.10 parts of Kraton 101 and 15.10 parts of Nevchem 140 coumarone-indene resin, to which preblend were added 9.75 parts of Oletac 100, 10.70 parts of Nevchem 140, 48.75 parts of Cumar MH 2½ coumarone-indene resin and 0.60 part of Dalpac 4C antioxidant. Coatings of the adhesive on various materials produced similar satisfactory results as described in Example 1.

EXAMPLE 5

A pressure-sensitive hot melt adhesive was prepared substantially as described in Example 1 from a preblend of 10.00 parts of Kraton 107 and 10.00 parts of Foral 105, to which preblend were added 30.00 parts of Oletac 100, 20.00 parts of Foral 105, 29.00 parts of Piccolyte Alpha 25 and 1.00 part of Dalpac 4C antioxidant. Coatings of the adhesive on various materials produced similar satisfactory results as described in Example 1.

EXAMPLE 6

A pressure-sensitive hot-melt adhesive was prepared substantially as described in Example 1 from a preblend of 20.75 parts of Kraton 101 and 20.75 parts of Foral 105, to which preblend were added 4.45 parts of Kraton 107, 14.83 parts of Oletac 100, 14.95 parts of Foral 105, 23.30 parts of Piccolyte Alpha 25 and 0.97 part of Dalpac 4C antioxidant. Coatings of the adhesive on various materials produced similar satisfactory results as described in Example 1.

EXAMPLE 7

A pressure-sensitive hot-melt adhesive was prepared substantially as described in Example 1 from a preblend of 15.0 parts of Kraton 101 and 11.00 parts of Foral 105, to which preblend were added 5.0 parts of Kraton 107, 20.00 parts of Oletac 100, 23.5 parts of Foral 105, 25.0 parts of Stabelite 3 triethylene glycol ester of hydrogenated rosin and 0.5 part of Dalpac 4C antioxidant. Coatings of the adhesive on various materials produced similar satisfactory results as described in Example 1.

EXAMPLE 8

A pressure-sensitive hot-melt adhesive was prepared substantially as described in Example 1 from a preblend of 24.00 parts of Kraton 102, 9.25 and 6.95 parts of Piccolyte Alpha 115 and 110, respectively, to which preblend were added 16.65 parts of Oletac 100, 42.55 parts of Piccolyte Alpha 25 and 0.6 part of Dalpac 4C antioxidant. Coatings of the adhesive on various materials produced similar satisfactory results as described in Example 1.

It will of course be understood that numerous modifications can be made in the ingredients, proportions and conditions described in the foregoing examples without departing from the scope of this invention as disclosed hereinbefore and as defined in the claims appended hereafter.

I claim:

1. A pressure-sensitive adhesive composition having instant rom temperature tack, good cold flow resistance and good shear strength which consists essentially of: as a first component, from about 5% to about 35% of an atactic polypropylene having a molecular weight in the range of about 15,000 to about 60,000; as a second component, from about 7% to about 30% of a polystyrene-polybutadiene-polystyrene or a polystyrene-polyisoprene-polystyrene block copolymer whose polystyrene blocks have molecular weights of from about 5000 to about 125,000 and are from about 20% to about 80% by weight of said copolymer, and whose polybutadiene or polyisoprene blocks have molecular weights of from about 15,000 to about 250,000; and as a third component, from about 45% to about 80% of an ethylene glycol, polyethylene glycol, glycerol or pentaerythritol rosin ester, hydrogenated rosin ester or methylated rosin ester, a coumarone-indene resin having a molecular weight of about 150 to about 800, a poly-($\alpha$-pinene) or poly-($\beta$-pinene) resin, a diene-olefin aliphatic hydrocarbon resin having a molecular weight of about 500 to about 1800, or a homopolymeric polystyrene resin having a molecular weight of about 200 to about 6000; said percentages being based on the total weight of said components in said adhesive composition.

2. A pressure-sensitive adhesive composition according to claim 1 containing from about 9% to about 30% of said first component, from about 10% to about 25% of said second component, and from about 50% to about 65% of said third component.

3. A pressure-sensitive adhesive composition according to claim 1 wherein said atactic polypropylene first component has a molecular weight of from about 16,000 to about 20,000.

4. A pressure-sensitive adhesive composition according to claim 1 wherein said polystyrene blocks have molecular weights of from about 8000 to about 45,000 and said polybutadiene or polyisoprene blocks have molecular weights of from about 35,000 to about 150,000.

5. A method of making a pressure-sensitive adhesive composition having instant room temperature tack, good cold flow resistance and good shear strength which comprises: masticating together as a first component from about 7% to about 30% of a polystyrene-polybutadiene-polystyrene or a polystyrene-polyisoprene-polystyrene block copolymer whose polystyrene blocks have molecular weights of from about 5000 to about 125,000 and are from about 20% to about 80% by weight of said copolymer, and whose polybutadiene or polyisoprene blocks have molecular weights of from about 15,000 to about 250,000, and as a second component from about 45% to about 80% of an ethylene glycol, polyethylene glycol, glycerol or pentaerythritol rosin ester, hydrogenated rosin ester or methylated rosin ester, a coumarone-indene resin having a molecular weight of from about 150 to about 800, a poly-($\alpha$-pinene) or poly-($\beta$-pinene) resin, a diene-olefin aliphatic hydrocarbon resin having a molecular weight of about 500 to about 1800, or a homopolymeric polystyrene resin having a molecular weight of from about 200 to about 6000, to form a uniform preblend thereof; melting said preblend to form a hot-melt mix; and blending into said hot-melt mix as a third component from about 5% to about 35% of an atactic polypropylene having a molecular weight of about 15,000 to about 60,000 to form a homogeneous adhesive composition; said percent values being by weight of the adhesive composition.

6. A method of making a pressure-sensitive adhesive composition according to claim 5 wherein said preblend is formed at a temperature of from about 60° F. to about 150° F., and said homogeneous adhesive is blended at a temperature of from about 270° F. to about 400° F.

7. A method of making a pressure-sensitive adhesive composition according to claim 5 wherein said first component is used in an amount of from about 10% to about 25%, said second component is used in an amount of from about 50% to about 65%, and said third component is used in an amount of about 9% to about 30%.

8. A method of making a pressure-sensitive adhesive composition according to claim 5 wherein the amount of said second component preblended with said first component is from about one-half to about equal the amount of said first component, and which further comprises blending the remaining portion of said second component into said hot-melt of said preblend.

9. A method of making a pressure-sensitive adhesive composition according to claim 5 wherein said atactic polypropylene third component has a molecular weight of from about 16,000 to about 20,000.

10. A method of making a pressure-sensitive adhesive composition according to claim 5 wherein, of said first component, said polystyrene blocks have molecular weights of from about 8,000 to about 45,000 and said polybutadiene or polyisoprene blocks have molecular weights of from about 35,000 to about 150,000.

References Cited

UNITED STATES PATENTS

| | | | |
|---|---|---|---|
| 3,239,478 | 3/1966 | Harlan | 260—27 |
| 3,360,488 | 12/1967 | Hall et al. | 260—23 |

DONALD E. CZAJA, Primary Examiner

W. E. PARKER, Assistant Examiner

U.S. Cl. X.R.

260—829, 874, 876 B, 897

UNITED STATES PATENT OFFICE
CERTIFICATE OF CORRECTION

Patent No. 3,686,107     Dated August 22, 1972

Inventor(s) Thomas E. Russell

It is certified that error appears in the above-identified patent and that said Letters Patent are hereby corrected as shown below:

Col. 2, line 21, change "its" to -- the --, line 24, change "S-B-S" to -- S-I-S --, line 59, change first "and" to -- in --; Col. 3, line 6, delete last comma, line 7, after "resins" insert comma; Col. 4, line 45, after "resins" insert comma; Col. 6, line 6, change "rom" to -- room --.

Signed and sealed this 23rd day of January 1973.

(SEAL)
Attest:

EDWARD M.FLETCHER,JR.
Attesting Officer

ROBERT GOTTSCHALK
Commissioner of Patents